L. E. DEMPSTER.
VAPOR ELECTRIC APPARATUS.
APPLICATION FILED OCT. 31, 1904.
901,427.
Patented Oct. 20, 1908.
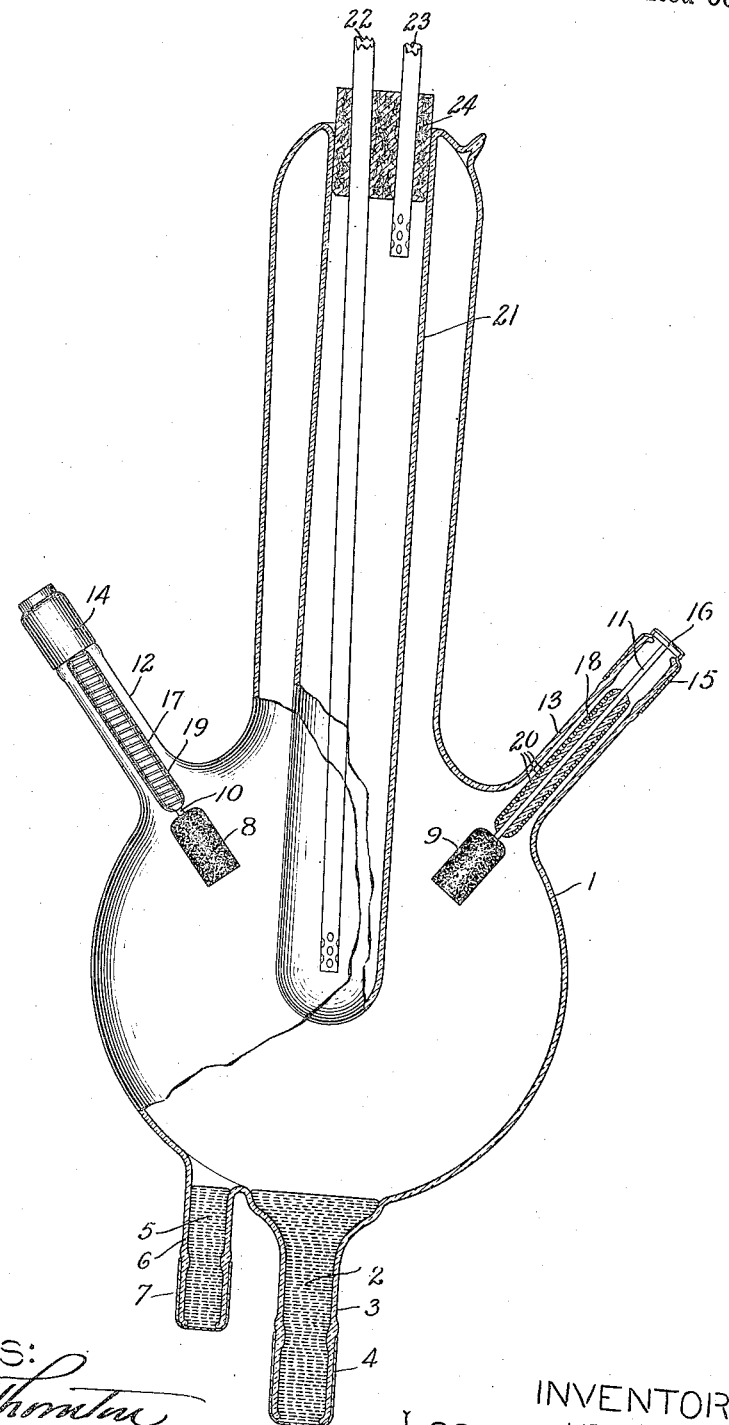
WITNESSES:
George A. Thornton.
Helen Alford
INVENTOR:
Leonard E. Dempster,
By Albert G. Davis
Att'y.

UNITED STATES PATENT OFFICE.

LEONARD ERNEST DEMPSTER, OF SCHENECTADY, NEW YORK, ASSIGNOR TO GENERAL ELECTRIC COMPANY, A CORPORATION OF NEW YORK.

VAPOR ELECTRIC APPARATUS.

No. 901,427.

Specification of Letters Patent.

Patented Oct. 20, 1908.

Application filed October 31, 1904. Serial No. 230,633.

*To all whom it may concern:*

Be it known that I, LEONARD ERNEST DEMPSTER, a subject of the King of Great Britain, residing at Schenectady, county of Schenectady, State of New York, have invented certain new and useful Improvements in Vapor Electric Apparatus, of which the following is a specification.

The invention herein described relates more especially to vapor electric apparatus and comprises means associated with said apparatus for dissipating heat generated therein so as to improve the operation thereof.

To this end my invention comprises various features of novelty which I have endeavored to point out with particularity in the appended claims.

The details of construction and mode of operation of my invention will be better understood by reference to the following description taken in connection with the accompanying drawings which represent, by way of illustration, a mercury vapor rectifier to which my invention is applied.

In the drawings, an exhausted receptacle of the rectifier is indicated at 1. The negative electrode, usually known as the cathode, is shown at 2, and consists, as will be seen, of a body of mercury contained in a tube 3 depending from the main envelop 1. The lower end of this tube is closed by a metal cap 4, preferably of thin iron, into which the glass, while the parts are hot, has been blown. An adjacent starting electrode 5 of mercury is contained by a laterally located tube 6, the lower end of which is similarly sealed by a cap 7. These metal caps 4 and 7 serve, as will be evident, as a means for electrical connection with their corresponding electrodes.

The main anodes 8 and 9 of the rectifier consist, in the present instance, of cylindrical bodies of some suitable material, such as artificial graphite or the like, and are supported respectively by the current-conveying conductors 10 and 11, which may be of iron or other suitable metal. These conductors are located axially in tubes 12 and 13 which extend upward and outwardly from the top of the bulbed portion of the receptacle 1. They are supported from the metal caps 14 and 15 which are sealed about the ends of the respective tubular extensions 12 and 13. This sealing operation, as before mentioned, is done while the parts are hot and is effected by blowing the ends of the tubes into close engagement with the thin metal caps. Upon cooling, the caps contract tightly about the glass and form a perfect vacuum-tight joint therewith.

The conductors 10 and 11 are not fastened directly to their respective caps but are riveted or otherwise secured to disks about each of which a cap is spun so as to form a rigid connection therewith. Thus in the case of the cap 15, which is shown in section, it will be seen that the upper end of the same is spun or compressed about a disk 16 to which the conductor 11 is attached by riveting or otherwise. The conductors 10 and 11 are surrounded for practically their entire length with bodies of glass 17 and 18. This glass is of soft character and constitutes a protecting and insulating sleeve. After having been placed on the wire the glass is heated up until it becomes soft and a wire of small diameter is then wound helically about the same as indicated in external view at 19 in the case of the conductor 10, and in sectional view at 20 in the case of the similar conductor 11. The small wire is wound so as to sink into the surface of the glass and after the winding is completed the glass is smoothed over so that the wire is practically or nearly enveloped thereby. This wire, which may be of copper, iron, or the like, improves the heat-radiating capacity of the glass sleeves and thereby helps to keep down the temperatures of the conductors 10 and 11 as the case may be, and serves also, in case of cracking or disintegration of the glass, to prevent the same from falling away from and exposing the conductor.

The rectifier to which I have shown my invention as applied is provided also with a reëntrant tubular member 21 in which a circulation of cooling fluid is maintained by inlet and outlet pipes 22 and 23 respectively passing through the stopper 24. The cooling member 21 serves to condense the surplus mercury vapor generated in the apparatus and thereby enables large currents to be transmitted through the apparatus.

What I claim as new and desire to secure by Letters Patent of the United States, is,—

1. The combination of a conductor, and a protective and radiating sleeve therefor consisting of vitreous material with metal embedded therein.

2. The combination of a conductor, and a protective and radiating sleeve therefor, consisting of vitreous material with wire embedded therein.

3. The combination of a conductor, and a protective and radiating sleeve therefor, consisting of glass with a helix of wire embedded therein.

4. The combination of an envelop or container, an electrode therein, a current conveying conductor for said electrode, and a protecting sleeve for said conductor consisting of vitreous material having metal in an elongated shape embedded therein.

In witness whereof, I have hereunto set my hand this 29th day of October, 1904.

LEONARD ERNEST DEMPSTER.

Witnesses:
BENJAMIN B. HULL,
HELEN ORFORD.